(12) United States Patent
Michael

(10) Patent No.: US 11,074,332 B2
(45) Date of Patent: Jul. 27, 2021

(54) METHODS AND SYSTEMS OF SECURELY TRANSFERRING DATA

(71) Applicant: iStorage Limited, Middlesex (GB)

(72) Inventor: John Michael, London (GB)

(73) Assignee: iStorage Limited, Middlesex (GB)

( * ) Notice: Subject to any disclaimer, the term of this patent is extended or adjusted under 35 U.S.C. 154(b) by 378 days.

(21) Appl. No.: 16/120,721

(22) Filed: Sep. 4, 2018

(65) Prior Publication Data

US 2019/0095604 A1 Mar. 28, 2019

(30) Foreign Application Priority Data

Sep. 5, 2017 (GB) ...................................... 1714256

(51) Int. Cl.
*G06F 21/34* (2013.01)
*H04L 29/06* (2006.01)
(Continued)

(52) U.S. Cl.
CPC .............. *G06F 21/34* (2013.01); *G06F 21/44* (2013.01); *G06F 21/606* (2013.01); *G06F 21/62* (2013.01);
(Continued)

(58) Field of Classification Search
CPC ................................. G06F 21/34; H04L 63/06
See application file for complete search history.

(56) References Cited

U.S. PATENT DOCUMENTS

| 7,409,550 B2 | 8/2008 | Avramopoulos et al. |
| 9,720,700 B1 | 8/2017 | Brown et al. |
| (Continued) | | |

FOREIGN PATENT DOCUMENTS

| EP | 2400754 | 12/2011 |
| GB | 2439838 | 1/2008 |
| (Continued) | | |

OTHER PUBLICATIONS

Schneier, "Applied Cryptography", 1996, J Wiley and sons, 2nd edition, pp. 31-33.*

(Continued)

*Primary Examiner* — William S Powers
(74) *Attorney, Agent, or Firm* — Nixon Peabody LLP

(57) ABSTRACT

The present disclosure relates to a method and system for securely transferring master keying material between a master dongle (10) and a slave dongle (12). Each dongle (10,12) is connected to a data transfer system. The slave dongle (12) contains a public key and a private key and the master dongle (10) contains master keying material that is to be transferred securely to the slave dongle (12). The data transfer system reads the slave dongle's public key and sends it to the master dongle (10). The master dongle (10) encrypts the master keying material with the slave dongle's public key to produce an encrypted master keying material. The encrypted master keying material is sent via the data transfer system to the slave dongle (12) and the slave dongle (12) decrypts the encrypted master keying material with the slave dongle's private key. This allows multiple users, each having a slave dongle (12*a-n*) that has been configured in this manner, to use the same master keying material to securely communicate with one another.

18 Claims, 4 Drawing Sheets

(51) Int. Cl.
*G06F 21/60* (2013.01)
*G06F 21/44* (2013.01)
*G06F 21/62* (2013.01)
*G06F 21/78* (2013.01)
*H04L 9/08* (2006.01)
*H04L 9/32* (2006.01)

(52) U.S. Cl.
CPC .......... *G06F 21/78* (2013.01); *H04L 9/0869* (2013.01); *H04L 9/0897* (2013.01); *H04L 9/3226* (2013.01); *H04L 63/0428* (2013.01); *H04L 63/06* (2013.01)

(56) References Cited

U.S. PATENT DOCUMENTS

| | | | |
|---|---|---|---|
| 10,129,020 B2 | 11/2018 | Le Saint | |
| 10,313,110 B2 | 6/2019 | Le Saint | |
| 10,666,428 B2 | 5/2020 | Le Saint | |
| 2003/0070078 A1* | 4/2003 | Nosrati | G06Q 20/3825 713/185 |
| 2003/0133576 A1* | 7/2003 | Grumiaux | H04L 9/0833 380/279 |
| 2003/0233573 A1 | 12/2003 | Phinney | |
| 2004/0153642 A1* | 8/2004 | Plotkin | H04L 9/0897 713/150 |
| 2005/0210249 A1 | 9/2005 | Lee et al. | |
| 2006/0036860 A1* | 2/2006 | Avramopoulos | H04L 9/0841 713/171 |
| 2006/0259579 A1* | 11/2006 | Beverly | H04L 63/08 709/217 |
| 2007/0113078 A1 | 5/2007 | Witt et al. | |
| 2008/0126802 A1* | 5/2008 | Li | H04L 9/3234 713/168 |
| 2008/0184341 A1 | 7/2008 | Sebesta et al. | |
| 2008/0263363 A1 | 10/2008 | Jueneman et al. | |
| 2011/0022856 A1* | 1/2011 | Ureche | G06F 21/78 713/193 |
| 2011/0113235 A1 | 5/2011 | Erickson | |
| 2012/0121084 A1 | 5/2012 | Tomlinson et al. | |
| 2012/0331287 A1 | 12/2012 | Bowman et al. | |
| 2013/0151844 A1 | 6/2013 | Messerschmidt | |
| 2014/0047513 A1* | 2/2014 | van't Noordende | H04L 63/0823 726/4 |
| 2014/0258707 A1 | 9/2014 | Denny | |
| 2015/0156022 A1 | 6/2015 | Asnaashari et al. | |
| 2015/0200774 A1 | 7/2015 | Le Saint | |
| 2015/0200918 A1 | 7/2015 | Khokhar et al. | |
| 2016/0021068 A1 | 1/2016 | Jueneman et al. | |
| 2016/0021109 A1 | 1/2016 | Jueneman et al. | |
| 2017/0222801 A1 | 8/2017 | Le Saint | |
| 2017/0230365 A1 | 8/2017 | Poete | |
| 2018/0205538 A1 | 7/2018 | Le Saint | |
| 2018/0205539 A1 | 7/2018 | Le Saint | |
| 2019/0260578 A1 | 8/2019 | Le Saint | |
| 2020/0145202 A1 | 5/2020 | Michael | |

FOREIGN PATENT DOCUMENTS

| | | |
|---|---|---|
| GB | 2566107 A | 3/2019 |
| GB | 2578767 A | 5/2020 |
| WO | WO 2020094585 A1 | 5/2020 |

OTHER PUBLICATIONS

International Search Report for PCT/GB2018/052458 dated Nov. 7, 2018.
Written Opinion for PCT/GB2018/052458 dated Nov. 7, 2018.
Great Britain Search Report for Application No. 1714256.3 dated Mar. 5, 2018.
Terminal Disclaimer in U.S. Appl. No. 16/675,963, filed Mar. 25, 2021.
PCT International Search Report in Application No. PCT/EP2019/080134, dated Dec. 13, 2019.
PCT International Written Opinion in Application No. PCT/EP2019/080134, dated Dec. 13, 2019.
Great Britain Search Report in Application No. GB1818156.0, dated Apr. 30, 2019.
Notice of Allowance in U.S. Appl. No. 16/675,963 dated Mar. 31, 2021.

* cited by examiner

METHODS AND SYSTEMS OF SECURELY TRANSFERRING DATA

The present disclosure relates to a method and system for securely transferring master keying material between a master dongle and a slave dongle, and a method and system for securely communicating data between users.

It is often desirable to transfer data securely between various users. Often, such data transfer will occur via a local network or via the Internet. When the data is sensitive it can be encrypted before transferring it over potentially insecure networks. Many businesses that use the internet to transfer data, either between employees of that company or with customers, make use of "public-key cryptography". In public-key cryptography, each user has a pair of cryptographic keys called the public key and the private key. The public key may be publically shared with anyone wishing to securely communicate with the key's owner, while the private key is for decrypting data that has been encrypted using that public key. When A wishes to communicate securely with B, A encrypts the message (data) using B's public key and sends the encrypted message to B. B then uses B's private key to decrypt the message. Advantageously, this method does not require the two users, A and B, to secretly exchange an encryption key with one another before communicating over insecure channels.

Another form of encryption is "symmetric-key encryption" in which the same encryption key is used for both encryption and decryption. In such a system, users A and B must first securely exchange the encryption key before they communicate with one another over insecure channels.

Symmetric-key encryption systems have advantages and disadvantages compared to public-key cryptography. Generally, symmetric-key systems are faster for encoding and decoding. In symmetric-key systems encrypted data can be transferred even if there is a possibility that the data will be intercepted. Since there is no key transmitted with the data, the chances of data being decrypted are lower than in public-key systems. Finally, only a recipient who has the key can decrypt the data. Thus senders can be confident that only an authorised recipient can decrypt the data. The main disadvantage of symmetric-key encryption is the requirement to provide the initial encryption key to all the users in a secure manner.

According to a first aspect, there is provided a method of securely transferring master keying material between a master dongle and a slave dongle, wherein the slave dongle contains a public key and a private key, wherein the master dongle contains master keying material, and wherein the master keying material is for allowing users of the dongles to securely access encrypted data; the method comprising: connecting the master dongle and the slave dongle to a data transfer system; transferring the slave dongle's public key to the master dongle via the data transfer system; using the slave dongle's public key at the master dongle to encrypt the master keying material and hence produce encrypted master keying material at the master dongle; transferring the encrypted master keying material to the slave dongle via the data transfer system; decrypting the encrypted master keying material with the slave dongle's private key at the slave dongle; and storing the master keying material at the slave dongle; such that a user of any of the dongles can use the master keying material to decrypt data encrypted by the same dongle or the other of the dongles.

The master keying material may be a master encryption key.

With this method, the slave dongle's private key and the unencrypted master keying material are advantageously not transferred across or read by the data transfer system. The method thus allows the secure production of one or more slave dongle(s) that contain the master keying material and hence allows for secure production of a set of dongles that share the same master keying material. The dongles may then provide a secure dongle-based symmetric key system. Advantageously the unencrypted master keying material is not accessible by the data transfer system at any point, and so even if the data transfer system is compromised (e.g. by an eavesdropper, a computer virus etc.) the master keying material is kept secret during the transfer. A dongle carrying such master keying material is useful as it allows users to readily transfer the dongle between various devices (e.g. from their work desktop to a home computer) and to maintain secure access to encrypted data. In particular, the dongle(s) may be used to access encrypted data stored in remotely accessible memory such as in the "cloud" so that a single secure data store can be accessed securely from any location.

The method may include transferring the master keying material to a plurality of slave dongles using the same method as set out in the first aspect. Thus, each one of multiple slave dongles can be securely programmed with the same master keying material from a single master dongle. This allows a plurality of users, each having a slave dongle, to securely communicate data to one another using the master keying material. Further, the encryption and decryption of data may be performed within the slave dongles whilst the master dongle is kept in a secure location. This can keep the master keying material safe as it is never transferred to a potentially insecure machine nor over a potentially insecure network.

In this context, an encryption key or keying material may be a random string of bits created explicitly for scrambling and unscrambling data (i.e. encrypting and decrypting data). Encryption keys are usually designed using algorithms that are intended to ensure that every key is unpredictable and unique. Thus, the master keying material, the slave dongle public key and/or the slave dongle private key may be a data string created for encrypting and decrypting data. The key(s) may have a length of 256 bytes (2048 bits) or more.

The master keying material may be randomly generated when the master dongle is first used, e.g. using a FIPS random number generator. In this manner, the manufacturer of the master dongle does not know the master keying material since it may be generated by a user having the master dongle. This ensures that there is no central repository of master keying materials that is vulnerable to hacking or theft. Further, it gives the user confidence that their encrypted communications cannot be decoded by the manufacturer.

The data transfer system may be a personal computer (PC) that, optionally, is connected to multiple slave dongles for rapid production of a set of slave dongles having the same master keying material. Alternatively, the data transfer system may be a dedicated device designed for the secure production of many slave dongles having the master keying material. Such a dedicated device is advantageously not connected to the internet and may be configured to only run the necessary processes for transferring (encrypted) data between master and slave dongles. For example, the data processing routine for performing the method may be hard-coded into a computer chip in the dedicated device. This can provide extra security when transferring the master keying material against attacks via the internet or from malicious dongles plugged into the dedicated device. In another example, the data transfer system may be a cable or a hub with no internal programs or processor. In this case, the master and slave dongles may be configured to carry out the method using a data processing device in one or each of the dongles. Thus, the dongle(s) may include a processor or similar for performing computing operations.

To further enhance the security of the dongles, the master dongle and/or the slave dongle(s) may include additional security to identify authorised users and to prevent access by unauthorised users. This may have the effect that only authorised users can access the master keying material so that even if a dongle is obtained by an unauthorised user then they cannot access the encrypted data. It also allows for the dongle(s) to be safely transferred between authorised users without risk of unauthorised access to the master keying material, for example by postal or courier delivery of the dongle(s). Thus, the dongle(s) may require identification of an authorised user before access to the content of the dongle is allowed. There may be an added layer of security before it is permitted to write new data to the dongle. The master dongle may require a higher level of authorisation before the master keying material can be transferred to another dongle. Thus, the slave dongle(s) and the master dongle when used for encrypting and decrypting data may be accessible to a normal user, whereas there may be a higher level user, such as an administrator, who is permitted access to the master dongle to copy the master keying material and/or access to the slave dongle(s) to access the slave dongle public key and to install new master keying material.

The added security may include a user authentication system such as a PIN entry system or a biometric sensor, for example. The dongle(s) may hence be configured to identify an authorised user by comparison of data obtained by the user authentication system with data stored on the dongle relating to authorised users. In the case of a PIN system the dongle may allow access at a normal level or an administrator level upon access of the correct PIN. In the case of a biometric system the dongle may allow access to one or more users previously enrolled with the dongle. The dongle may be arranged to enrol users in any suitable manner, and it may be supplied to the first user in an enrolment mode allowing the first user to enrol their own biometric and/or their own PIN, with the first user optionally having administrator level access. Administrator level access may permit the enrolment of additional users to the user authentication system.

Thus, before the step of transferring the slave dongle's public key to the master dongle over the data transfer system, the method may comprise the steps of: unlocking the master dongle via the master dongle user authentication system, wherein unlocking the master dongle allows the master dongle to send and receive data; and, in the case where the slave dongle is not factory reset, unlocking the slave dongle via the slave dongle user authentication system, wherein unlocking the slave dongle allows the slave dongle to send and receive data. The dongles may remain unlocked during the process of transfer of the master keying material and they may be automatically locked after that process has been completed, such as after they are disconnected from the data transfer system.

The method may comprise scrambling the slave dongle's public key using a predetermined scrambling algorithm prior to transferring the slave dongle's public key, and unscrambling the slave dongle's public key at the master dongle after transferring slave dongle's public key and prior to encrypting the master keying material. In this case the slave dongle(s) may include a suitable scrambling algorithm and the master dongle may include instructions for unscrambling the scrambled slave dongle's public key. This helps to protect against the case where the data transfer system is compromised and the malicious user has emulated a slave dongle but generated his own public key that is sent to the master dongle for the purposes of discovering the master keying material.

With the added use of scrambling of the slave dongle public key, only the legal slave dongles know the scrambling algorithm and this may be hard-coded onto the dongles, e.g. at the factory when first produced. The data transfer system (and any software thereon for the purposes of performing the method) has no knowledge of the scrambling algorithm, and optionally only the master dongle includes the instructions needed to unscramble the slave dongle public key. This provides a further layer of security against malicious emulated slave dongles, because the hacker has no knowledge of the scrambling algorithm as this is not contained in, nor ever transferred over, the data transfer system, and may only ever be present on the master dongle, where it may be protected via a suitable user authentication system as discussed above. In a case where the length of the public key is 256 bytes (2048 bits), to brute-force crack the scrambling algorithm, an attacker must try 256! times to hack the scrambling algorithm.

A dongle is typically a portable piece of hardware that connects to another device to provide that other device with additional functionality. For example, one known type of dongle is a USB memory dongle that allows for data to be transferred between devices via the dongle. Another type of dongle is a data encryption dongle for encrypting data being stored on the dongle or being stored on an external memory. Such dongles are produced by iStorage Limited of the United Kingdom under the trade name Datashur®. WO 2009/136161 discloses a prior art dongle for hardware encryption of data as it passes through the dongle. The slave dongle(s) and/or the master dongle of the present method may be arranged to operate in a similar fashion. The dongles may hence be dongles containing memory such as flash memory. The dongles may include a USB connection for joining the dongles to the data transfer system. USB is a commonly used standard for transferring data between devices. Therefore, dongles that can connect via USB to a generic computing device (desktop computer, laptop computer, tablet, smartphone etc.) will be widely useable.

As noted above, a plurality of slave dongles may be provided, each having a respective public key and a respective private key; and the method may comprise, for each slave dongle in turn: transferring the slave dongle's public key to the master dongle; encrypting the master keying material with the slave dongle's public key at the master dongle; transferring the encrypted master keying material to the slave dongle; and decrypting the encrypted master keying material with the slave dongle's private key at the slave dongle.

This provides the advantage of rapidly producing a plurality of slave dongles that can be distributed to a plurality of users for the purposes of securely sharing information encrypted with the master keying material.

According to another aspect, there is provided a method of sharing data securely between authorised computing devices, wherein a first computing device is connected to a first slave dongle and a second computing device is connected to a second slave dongle, the first and second slave dongles having been programmed with the same master keying material by any of the methods described above, the method comprising: encrypting first data using the first slave dongle with the master keying material stored in the first slave dongle; transferring the encrypted first data, optionally across a network, to the second computing device; decrypting the encrypted first data using the second slave dongle; and transferring the unencrypted first data from the second slave dongle to the second computing device.

According to another aspect, there is provided a system for securely transferring master keying material between a master dongle and a slave dongle, the system comprising: a data transfer system; a master dongle containing a master processor, and master keying material; and a slave dongle containing a slave processor, a slave public key and a slave private key; wherein the data transfer system has a plurality of ports for connecting to the master dongle and to the slave dongle; the data transfer system being configured to transfer the slave dongle's public key to the master dongle; the master dongle being configured to encrypt the master keying material with the slave dongle's public key to produce an encrypted master keying material and to return the encrypted master keying material to the data transfer system; the data transfer system being configured to transfer the encrypted master keying material to the slave dongle; the slave dongle being configured to decrypt the encrypted master keying material using the slave dongle's private key and to store the master keying material at the slave dongle such that a user of any of the dongles can use the master keying material to decrypt data encrypted by the same dongle or the other of the dongles.

The master dongle may comprise a master dongle user authentication system, the slave dongle may comprise a slave dongle user authentication system, and/or the data transfer system may comprise a data transfer system user authentication system, wherein the dongles and/or data transfer system are configured to require an authorisation code input at a respective user authentication system before allowing transfer of data between the dongles. The system allows the production of slave dongles that contain the master keying material in a secure manner. The unencrypted master keying material does not need to be put on the data transfer system at any point, and so even if the data transfer system is compromised (e.g. by a computer virus etc.) the master keying material is kept secret during the transfer. A plurality of slave dongles produced by such a system may be distributed to a plurality of users who wish to communicate securely with one another. Each of the slave dongles has been securely programmed with the same master keying material and so the users can securely communicate data to one another using the master keying material even when communicating via potentially insecure networks (e.g. the internet).

The slave dongle may be configured to scramble the slave dongle's public key using a predetermined scrambling algorithm prior to transferring the slave dongle's public key, such that the data transfer system transfers a scrambled slave dongle's public key; and the master dongle may contain the scrambling algorithm and be configured to unscramble the scrambled slave dongle's public key prior to encrypting the master keying material.

The data transfer system (and any software thereon for the purposes of performing the method) has no knowledge of the scrambling algorithm. This provides a further layer of security against malicious emulated slave dongles, because the hacker has no knowledge of the scrambling algorithm as this is not contained in, nor ever transferred over, the data transfer system.

The system may comprise a plurality of slave dongles, each having a respective public key and a private key; and the data transfer system contains at least two ports, wherein one port is for connecting to the master dongle and the other port is for connecting to at least one dongle.

The system may comprise a plurality of slave dongles, each having a respective public key and a private key; and the data transfer system contains at least three ports, wherein one port is for connecting to the master dongle and the at least two other ports are for connecting to at least two of the plurality of slave dongles.

A system according to this arrangement can quickly prepare a plurality of slave dongles, without the user having to remove each slave dongle after it receives the master keying material and attach a new slave dongle to the data transfer system.

According to another aspect there is provided a system for securely communicating data between users, the system comprising: a first computing device coupled to a first slave dongle, a second computing device coupled to a second dongle, wherein the second dongle is a second slave dongle or a master dongle, wherein the master and slave dongles have been configured using any of the aforementioned methods or wherein the master and slave dongles have been configured by any of the abovementioned systems, wherein, when the first computing device is used to send first data to the second computing device, the first computing device is configured to send the first data to the first slave dongle, the first slave dongle is configured to encrypt the first data using the master keying material, and the first device is configured to send the encrypted first data to the second computing device, optionally via a network, and wherein the second computing device is configured to receive the first encrypted data and send the first encrypted data to the second dongle, the second dongle is configured to decrypt the first encrypted data using the master keying material and to send the decrypted first data to the second computer device.

This system allows users to communicate securely with one another using symmetric-key encryption which is faster than public-key encryption. Further, as the disclosure provides a secure method for providing the master keying material to users, a known disadvantage of symmetric-key encryption regarding the initial transfer of the master keying material is overcome.

According to another aspect, there is provided a dedicated device for securely transferring master keying material between a master dongle and a slave dongle, the dedicated device comprising a plurality of ports for connecting to the master dongle and to the slave dongle; the dedicated device being configured to request a public key from the slave dongle and to transfer the public key to the master dongle, and to request encrypted master keying material from the master dongle and transfer the encrypted master keying material to the slave dongle.

A dedicated device according to this aspect may be provided as a standalone device for preparing slave dongles, which may have greater security than a user's PC configured to perform the method.

Certain embodiments of the present disclosure will now be described in greater detail by way of example only and with reference to the accompanying drawings in which.

Figure 1:
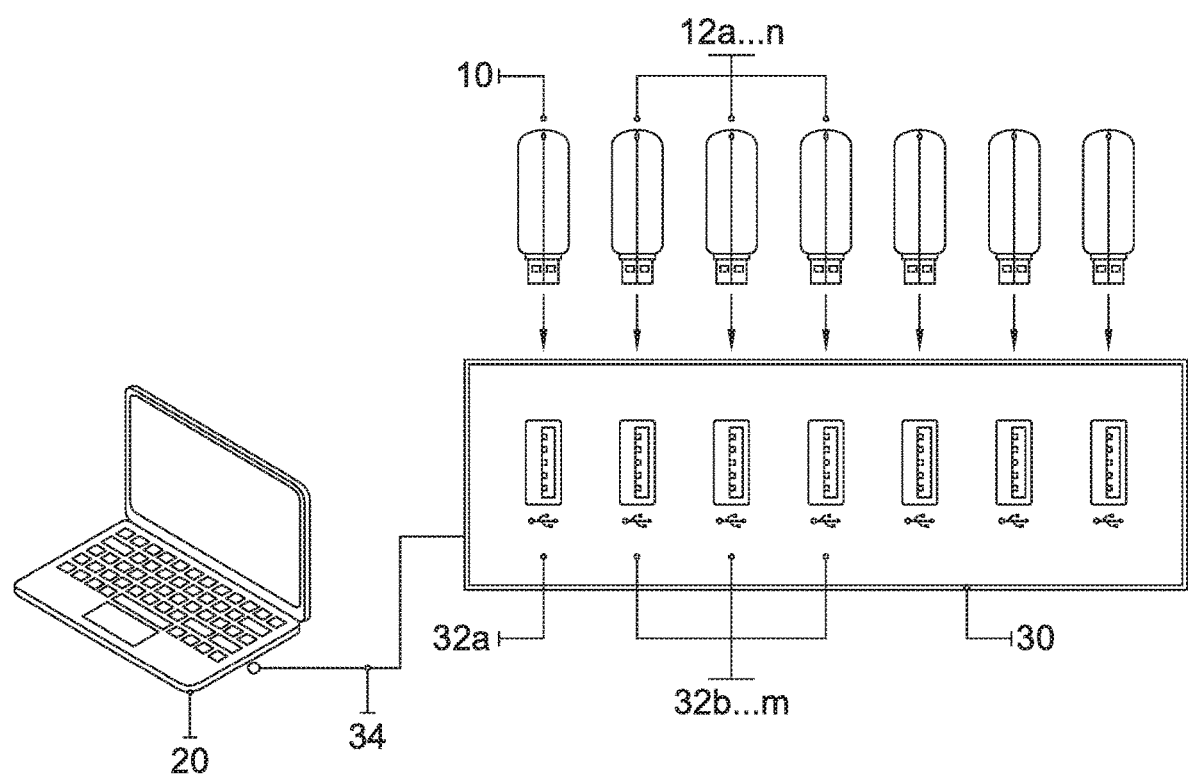
FIG. 1 shows a computer attached to a hub into which are plugged a master dongle and several slave dongles.

FIG. 1 shows a computer 20 and a hub 30 plugged into the computer. A master dongle 12 is plugged into a first port 32a on the hub 30. One or more slave dongles 12a-n, generally designated 12, are plugged into other ports 32b-m on the hub 30.

The hub 30 may be any standard USB hub, or a hub with another type of port (e.g. FireWire™). Alternatively, the master 10 and slave 12 dongles may be attached directly to ports in the computer 20, without the use of a hub 30.

The above described system, comprising the computer 20 and dongles 10, 12, is for securely transferring master keying material from the master dongle 10 to the slave dongle(s) 12a-n. This allows production of a number of slave dongles that all share the same master keying material. For example, all slave dongles that belong to the same company or working group may use the same master keying material for encryption and decryption when transferring data to one another within the company or working group.

The master keying material may be a master encryption key.

The computer 20 is just one example of a generic data transfer system for connecting the master dongle 10 and the slave dongle(s) 12a-n. However, it is to be understood that other forms of data transfer system may be used.

For example, the data transfer system may be a dedicated device 40 as described below in conjunction with FIG. 3.

Alternatively, the data transfer system may be a cable or a hub with no internal processor, in which case one or both of the master and slave dongles 10, 12 may contain processors configured perform the method steps for securely transferring the master keying material.

When the master dongle 10 is first used, master keying material may be randomly generated by a FIPS approved Random Number Generator and this is stored inside a secure processor in the master dongle 10 in an encrypted form. Each slave dongle 12a-n has a unique public/private key pair, suitable for use in public key cryptography. As is well understood in public key cryptography, the public key may be publicly shared and seen by others, both friendly and unfriendly. The private key is kept secret and may be used to decrypt data that has been encrypted using the public key.

The computer 20 may run software that is designed for securely transferring the master keying material to each of the slave dongles 12a-n in turn. These slave dongles may then be distributed to e.g. workers in the company or working group for use with their own devices (e.g. PC, laptop, tablet, phone etc.) to allow these devices to securely communicate with one another using the master keying material.

Figure 2:
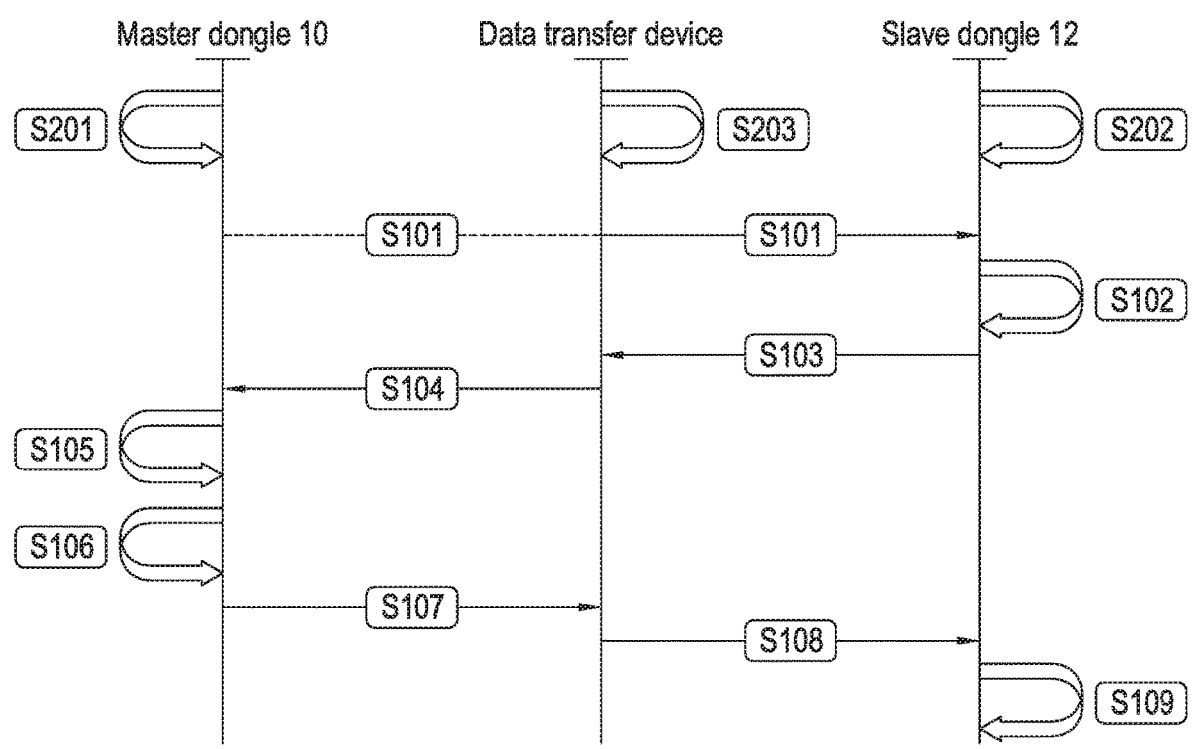
FIG. 2 shows a sequence diagram of method steps for securely transferring master keying material from a master dongle to a slave dongle.

FIG. 2 shows a sequence diagram showing the method by which the master keying material may be securely transferred from the master dongle 10 to each slave dongle 12a-n.

Initial steps 201, 202, and 203 are each optional and independent from one another.

In step 201, a PIN or other authentication is entered into the master dongle 10 to unlock the master dongle 10 such that it may send and receive data.

In step 202, a PIN or other authentication is entered into the slave dongle 12 to unlock the slave dongle 12 such that it may send and receive data. Each slave dongle 12a-n may have a unique PIN or other authentication required to unlock the device. Alternatively, a plurality of slave dongles 12a-n may have the same PIN or temporary single-use PIN, for ease of initial setup.

In step 203, a PIN or other authentication is entered into the data transfer system to allow it to transfer data between and/or communicate with the master and slave dongles 10, 12.

Optional step 101: the data transfer system may request the public key from the slave dongle 12. This request may originate from the master dongle 10 (as indicated by the dashed line in FIG. 2) or from a computer 20 or dedicated device 40 etc.

Optional step 102: the slave dongle may scramble its public key using a predetermined scrambling algorithm (i.e. such that a scrambled public key is presented to the data transfer system in step 103).

Step 103: The slave dongle's public key (optionally scrambled) is transferred to the data transfer system.

Step 104: the slave dongle's public key is transferred to the master dongle 10.

Optional step 105: if the slave dongle's public key was scrambled at step 102, the master dongle, having been preprogrammed with the scrambling algorithm, unscrambles the public key.

Step 106: the master dongle 10 encrypts the master keying material using the (unscrambled) slave dongle's public key.

Step 107: the encrypted master keying material is transferred from the master dongle 10 to the data transfer system.

Step 108: encrypted master keying material is transferred to the slave dongle 12.

Step 109: the slave dongle decrypts and stores the master keying material using the slave dongle's private key.

According to the method shown in FIG. 2, the data transfer system never sees the unencrypted master keying material. Thus, if the data transfer system is compromised by an attacker, the attacker cannot readily discover the master keying material.

The data transfer system may be active in e.g. requesting the slave dongle's public key or may be passive and simply act as a transmission medium for data sent by the dongles 10, 12.

Figure 3:
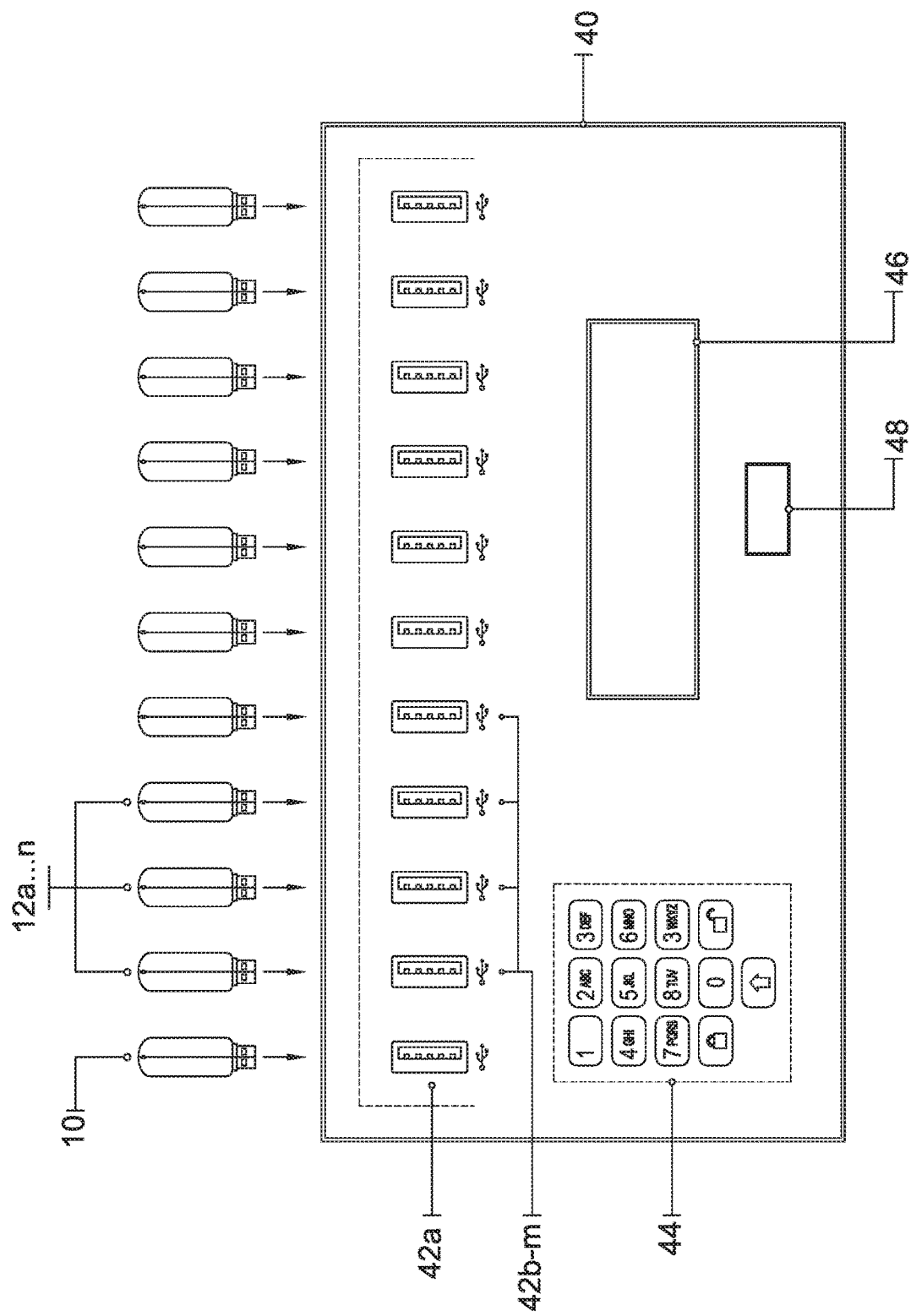
FIG. 3 shows a dedicated device for accepting a master dongle and a plurality of slave dongles.

FIG. 3 shows an alternative system for securely transferring master keying material from the master dongle 10 to the slave dongle(s) 12a-n. In this system, a dedicated device 40 is provided for performing the above method steps 101-109. That is, the dedicated device 40 is the data transfer system in this example.

The dedicated device 40 contains a plurality of ports 42a-m. A first of the ports 42a is for connecting to the master dongle 10. The remaining ports 42b-m are each for connecting to one of the plurality of slave dongles 12a-n.

The dedicated device further comprises a set of control keys 44, a display device 46, and a control button 48.

The control keys 44 may comprise a numeric keyboard with numbers 0 to 9, a lock button, an unlock button, and an arrow button. The dedicated device 40 may optionally require a numeric code to unlock the device (i.e. step 203) before it will perform the method steps 101-109. The lock button may be used to re-lock the dedicated device 40 after use, to prevent unauthorized users making their own slave dongles 12.

The display screen may be a LCD screen for displaying messages to a user, such as "Locked", "Unlocked", "Ready to transfer" etc.

Pressing the copy button 48 may cause the dedicated device 40 to start securely transferring the master keying material from a master dongle 10 plugged into the first port 42a to the slave dongle(s) 12a-n plugged into the other port(s) 42b-m.

When multiple slave dongles 12a-n are plugged into the dedicated device 40, the dedicated device 40 may perform the method steps 101-109 for each slave dongle 12 in turn. That is, steps 101 to 109 are performed for a first slave dongle 12a, and once complete, steps 101-109 are performed for a second slave dongle 12b etc.

Similarly, when multiple slave dongles 12a-n are plugged into the computer 20 (or generally, into the data transfer system), the computer 20 may perform the method steps 101-109 for each slave dongle 12 in turn. That is, steps 101 to 109 are performed for a first slave dongle 12a, and once complete, steps 101-109 are performed for a second slave dongle 12b etc.

Once a plurality of slave dongles 12a-n have the master keying material stored thereon, the slave dongles 12a-n may be distributed to a number of users, e.g. employees or member of a working group to allow them to securely exchange data with one another.

Figure 4:
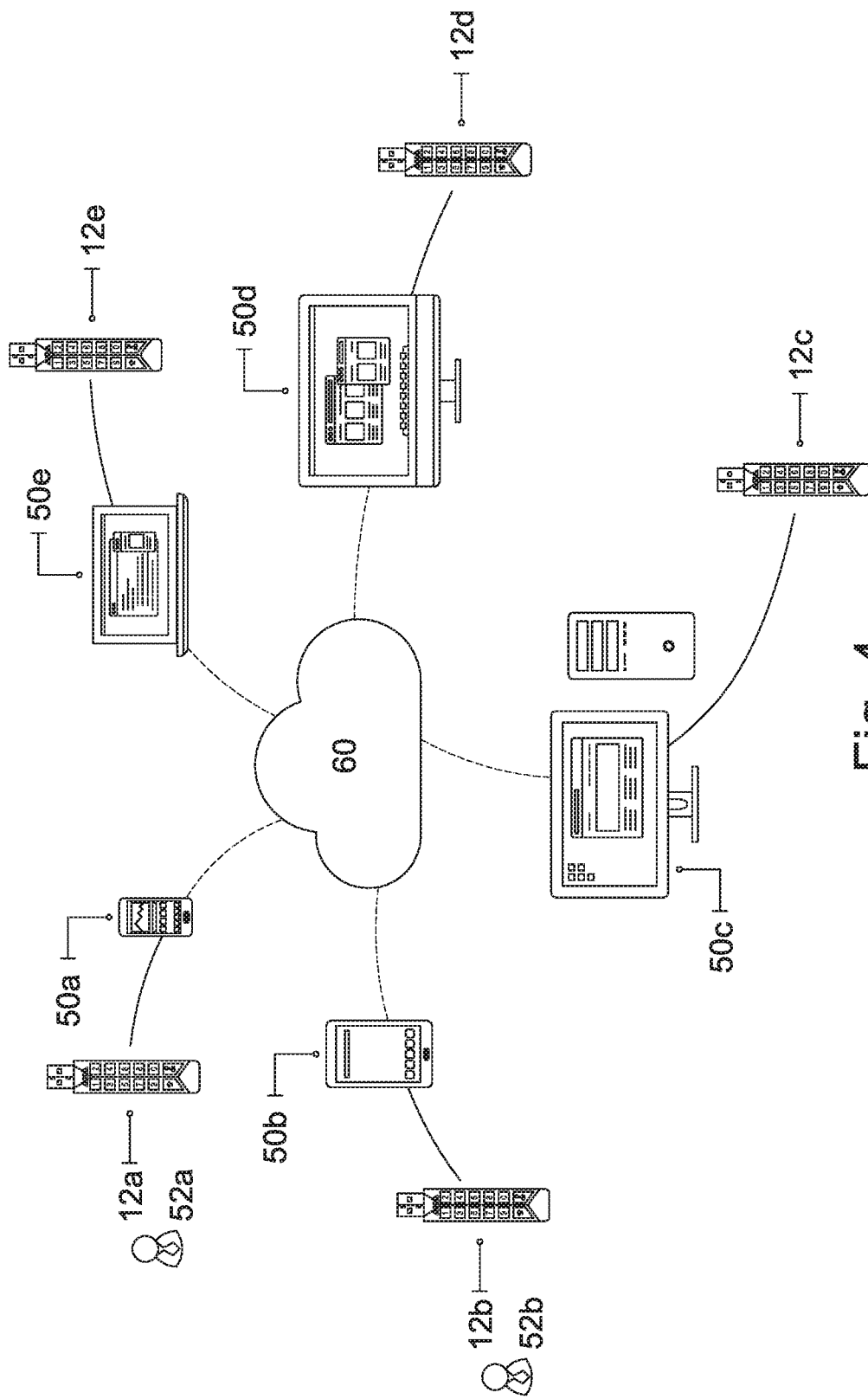
FIG. 4 shows a system of multiple devices, each device having a slave dongle, wherein users can communicate securely with one another over a network using common master keying material.

FIG. 4 shows a schematic diagram in which multiple users may communicate with one another via a network 60 (e.g. via the cloud), using multiple different devices 50a-e. The devices 50a-e may be any of a desktop computer, a tablet computer, a smartphone, a laptop computer and/or any other commonly used computing device capable of connecting to a slave dongle 12.

A respective slave dongle 12a-e is plugged into each device 50a-e. Each slave dongle 12a-e has been prepared with the same master keying material by the method shown above. When a first user 52a wants to share data with another user 52b, the first user 52a instructs his device 50a to send the data to the other user 52b via the network 60. The slave dongle 12a of the first user 52a encrypts the data using the master keying material. The data is then sent via the network 60 to the second user 52b. The second user's device 50b receives the encrypted data and passes it to the second slave dongle 12b. The second slave dongle 12b then decrypts the data using the master keying material and returns the unencrypted data to the second user's device 50b.

In this arrangement, the master keying material is never read by or transferred onto the devices 50a-e, nor is it seen by the network 60. Instead, the master keying material is only ever present on a secure processor in each of the slave dongles 12a-e. Thus, if the network 60 security is compromised, an eavesdropper/hacker will only ever see encrypted data.

Further, if the security of one or more of the devices 50a-e is compromised, the eavesdropper/hacker will only ever see the encrypted and unencrypted data on that device but will not thereby gain access to the master keying material and thus will not be able to compromise the whole network.

Consequently, the compromised device may be repaired/re-secured (e.g. by running an anti-virus program or similar) without requiring that new master keying material is prepared and delivered to each user on a new slave dongle 12.

In an alternative embodiment, not pictured, one of the master dongle 10 or a slave dongle 12 may be configured to perform the method when the two dongles 10, 12 are connected together via e.g. a cable or hub. In this case, the cable is the data transfer system. In this embodiment, all steps requiring a processor are carried out by the master dongle 10 or the slave dongle 12 as appropriate. The method nonetheless works to securely transfer master keying material between master dongle and a slave dongle, as the method does not require processing to be done by the data transfer system. This ensures that an eavesdropper reading signals on the cable never sees the unencrypted master keying material.

The invention claimed is:

1. A method of securely transferring master keying material between a master dongle and a slave dongle,
    wherein the slave dongle contains a public key and a private key,
    wherein the master dongle contains master keying material, and wherein the master keying material is for allowing users of the dongles to securely access encrypted data;
    the method comprising:
    connecting the master dongle and the slave dongle to a data transfer system;
    transferring the slave dongle's public key to the master dongle via the data transfer system;
    using the slave dongle's public key at the master dongle to encrypt the master keying material and hence produce encrypted master keying material at the master dongle;
    transferring the encrypted master keying material to the slave dongle via the data transfer system;
    decrypting the encrypted master keying material with the slave dongle's private key at the slave dongle; and
    storing the master keying material at the slave dongle;
    such that a user of any of the dongles can use the master keying material to decrypt data encrypted by the same dongle or the other of the dongles.

2. The method of claim 1 wherein the master keying material is randomly generated when the master dongle is first used, wherein the master keying material is generated using a FIPS random number generator.

3. The method of claim 1 wherein, before the step of transferring the slave dongle's public key to the master dongle over the data transfer system, the method comprises the steps of:
    unlocking the master dongle via a master dongle user authentication system, wherein unlocking the master dongle allows the master dongle to send and receive data;
    and, in the case where the slave dongle is not factory reset, unlocking the slave dongle via a slave dongle user authentication system, wherein unlocking the slave dongle allows the slave dongle to send and receive data.

4. The method according to claim 1, comprising
    scrambling the slave dongle's public key using a predetermined scrambling algorithm prior to transferring the slave dongle's public key, and
    unscrambling the slave dongle's public key at the master dongle after transferring the slave dongle's public key and prior to encrypting the master keying material.

5. The method according to claim 1, wherein the master dongle is a first removable dongle, and wherein the slave dongle is a second removable dongle.

6. The method according to claim 1, wherein the slave dongle's private key and the unencrypted master keying material are not transferred to or read by the data transfer system.

7. The method according to claim 1, wherein a plurality of slave dongles are provided, each having a respective public key and a respective private key; and
    wherein the method comprises, for each slave dongle in turn:
    transferring the slave dongle's public key to the master dongle;

encrypting the master keying material with the slave dongle's public key at the master dongle;

transferring the encrypted master keying material to the slave dongle; and decrypting the encrypted master keying material with the slave dongle's private key at the slave dongle.

8. A method of sharing data securely between authorised computing devices, wherein a first computing device is connected to a first slave dongle and a second computing device is connected to a second slave dongle, the first and second slave dongles having been programmed with the same master keying material by the method of claim 1, the method comprising:

encrypting first data using the first slave dongle with the master keying material stored in the first slave dongle;

transferring the encrypted first data, optionally across a network, to the second computing device;

decrypting the encrypted first data using the second slave dongle; and transferring the unencrypted first data from the second slave dongle to the second computing device.

9. A system for securely transferring master keying material between a master dongle and a slave dongle, the system comprising:

a data transfer system;

a master dongle containing a master processor, and master keying material; and a slave dongle containing a slave processor, a slave public key and a slave private key;

wherein the data transfer system has a plurality of ports for connecting to the master dongle and to the slave dongle;

the data transfer system being configured to transfer the slave dongle's public key to the master dongle;

the master dongle being configured to encrypt the master keying material using the slave dongle's public key to produce an encrypted master keying material;

the data transfer system being configured to transfer the encrypted master keying material to the slave dongle; and the slave dongle being configured to decrypt the encrypted master keying material using the slave dongle's private key and to store the master keying material at the slave dongle such that a user of any of the dongles can use the master keying material to decrypt data encrypted by the same dongle or the other of the dongles.

10. The system of claim 9, wherein the master dongle comprises a master dongle user authentication system, the slave dongle comprises a slave dongle user authentication system, and/or the data transfer system comprises a data transfer system user authentication system, wherein the dongles and/or data transfer system are configured to require an authorisation code input at a respective user authentication system before allowing transfer of data between the dongles.

11. The system of claim 9, wherein the master dongle is configured to generate random keying material when the master dongle is first used, wherein the master keying material is generated using a FIPS random number generator.

12. The system according to claim 9, wherein the slave dongle is configured to scramble the slave dongle's public key using a predetermined scrambling algorithm prior to transferring the slave dongle's public key, such that the data transfer system transfers a scrambled slave dongle's public key; and the master dongle contains the scrambling algorithm and is configured to unscramble the scrambled slave dongle's public key prior to encrypting the master keying material.

13. The system according to claim 9, wherein the system comprises a plurality of slave dongles, each having a respective public key and a private key; and the data transfer system contains at least three ports, wherein one port is for connecting to the master dongle and the at least two other ports are for connecting to at least two of the plurality of slave dongles;

wherein the system is configured to securely transfer the master keying material to each slave dongle in turn.

14. A system for securely communicating data between users, the system comprising:

a first computing device coupled to a first slave dongle, a second computing device coupled to a second dongle, wherein the second dongle is a second slave dongle or a master dongle, wherein the master and slave dongles have been configured using the method according to claim 1 or wherein the master and slave dongles have been configured by the system according to any of claim 9;

wherein, when the first computing device is used to send first data to the second computing device, the first computing device is configured to send the first data to the first slave dongle, the first slave dongle is configured to encrypt the first data using the master keying material, and the first device is configured to send the encrypted first data to the second computing device, optionally via a network, and wherein the second computing device is configured to receive the first encrypted data and send the first encrypted data to the second dongle, the second dongle is configured to decrypt the first encrypted data using the master keying material and to send the decrypted first data to the second computer device.

15. The system according to claim 13, wherein each dongle is configured to require a user identification to unlock the dongle for use.

16. The system of claim 15, wherein each dongle has a plurality of buttons and the user identification is a code to be input by pressing the buttons in a predetermined order.

17. The system of claim 13 further comprising a server, wherein each dongle is configured to have an identification and configured to require an authorisation code from the server in order to perform encryption and decryption, and wherein the server is configured to have a whitelist or a blacklist of dongle identifications such that unauthorised dongles having the master keying material are excluded from communicating with authorised dongles having the master keying material.

18. A dedicated device for securely transferring master keying material between a master dongle and a slave dongle, the dedicated device comprising a plurality of ports for connecting to the master dongle and to the slave dongle;

the dedicated device being configured to request a public key from the slave dongle and to transfer the public key to the master dongle, and to request encrypted master keying material from the master dongle and transfer the encrypted master keying material to the slave dongle.

* * * * *